United States Patent [19]  
Schaut et al.

[11] Patent Number: 4,551,012  
[45] Date of Patent: Nov. 5, 1985

[54] MICROFILM CAMERA FOR FILMING PUNCH CARDS

[76] Inventors: Josef Schaut, Freiher von Stein Strasse 8, 6367 Karben 1; Peter Rüppel, Söderweg 39, Bad Nauheim, both of Fed. Rep. of Germany

[21] Appl. No.: 642,061

[22] Filed: Aug. 16, 1984

[30] Foreign Application Priority Data

Aug. 18, 1983 [DE] Fed. Rep. of Germany ....... 3329804  
Aug. 18, 1983 [DE] Fed. Rep. of Germany ....... 3320806

[51] Int. Cl.$^4$ .................... G03B 27/48; G03B 27/50; G03B 27/32; G03B 27/52  
[52] U.S. Cl. ........................................ 355/50; 355/64  
[58] Field of Search ...................... 355/27, 50, 51, 64, 355/65

[56] References Cited

U.S. PATENT DOCUMENTS

| | | | |
|---|---|---|---|
| 3,588,243 | 6/1971 | Osawa et al. | 355/64 X |
| 3,669,537 | 6/1972 | Kobayashi | 355/50 |
| 3,891,315 | 6/1975 | Kolibas | 355/51 X |
| 3,947,118 | 3/1976 | Amort | 355/64 X |
| 3,966,318 | 6/1976 | Amort | 355/64 |
| 4,043,661 | 8/1977 | Yamada et al. | 355/50 |
| 4,408,876 | 10/1983 | Steidle | 355/64 X |

Primary Examiner—Richard A. Wintercorn  
Attorney, Agent, or Firm—Kurt Kelman

[57] ABSTRACT

The microfilm camera is designated for filming punch cards. It is comprised of a camera box containing the exposing and processing facilities, said box being vertically adjustable with respect to the table for receiving the originals arranged beneath said box, and of punch card conveying elements and at least one lateral card-discharging slot and a punch card collected disposed following said slot.

A punch card reversing facility is arranged upstream of the collector in order to deliver the punch cards to the collector not only in the correct sequence, but also with their inscribed surfaces facing down. Camera boxes with ejection of the punch cards at both sides are provided with a transverse conveyor conveying the punch cards alternately from the one and other side to a central collector, said punch cards arriving in said central collector with their sides reversed.

12 Claims, 9 Drawing Figures

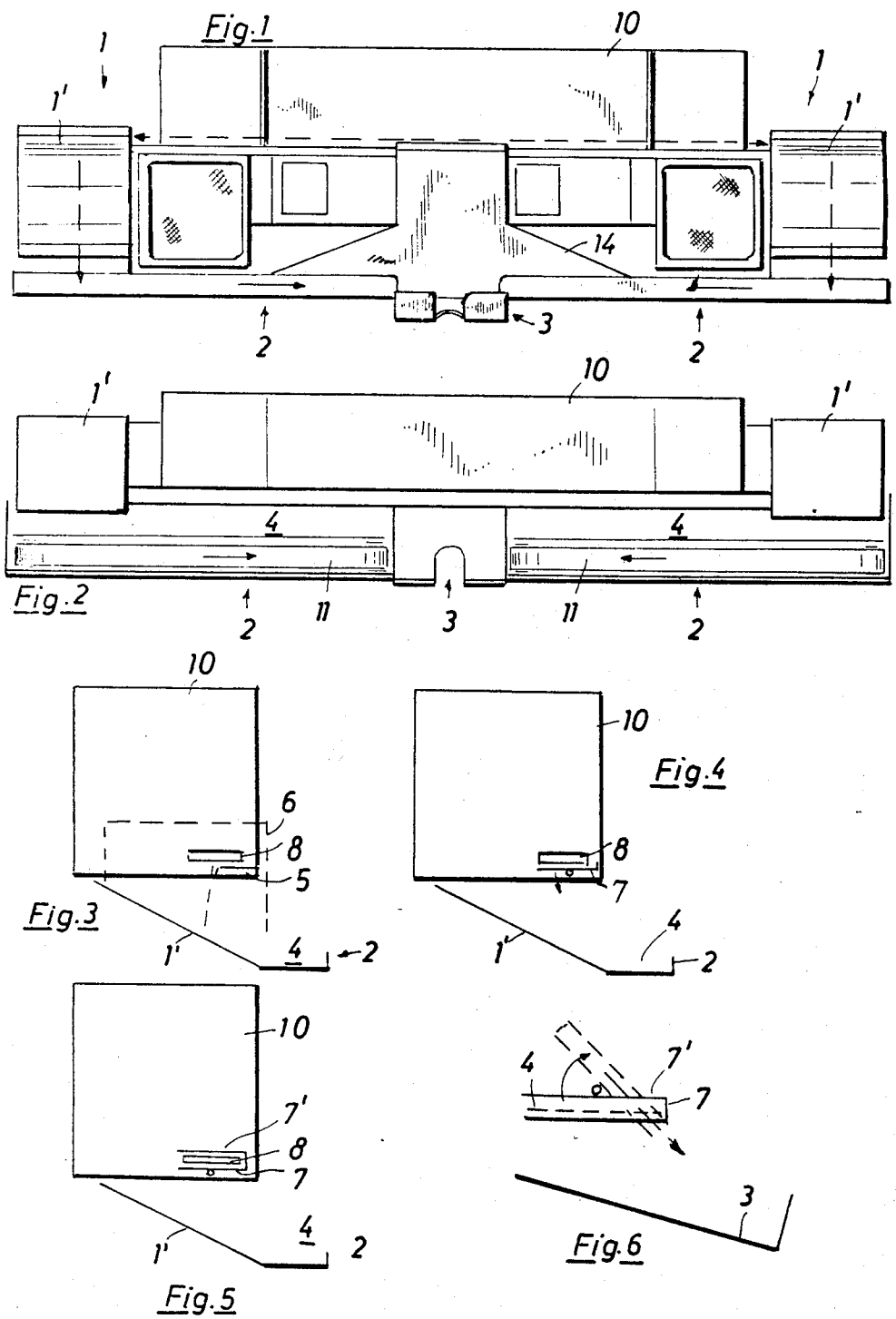

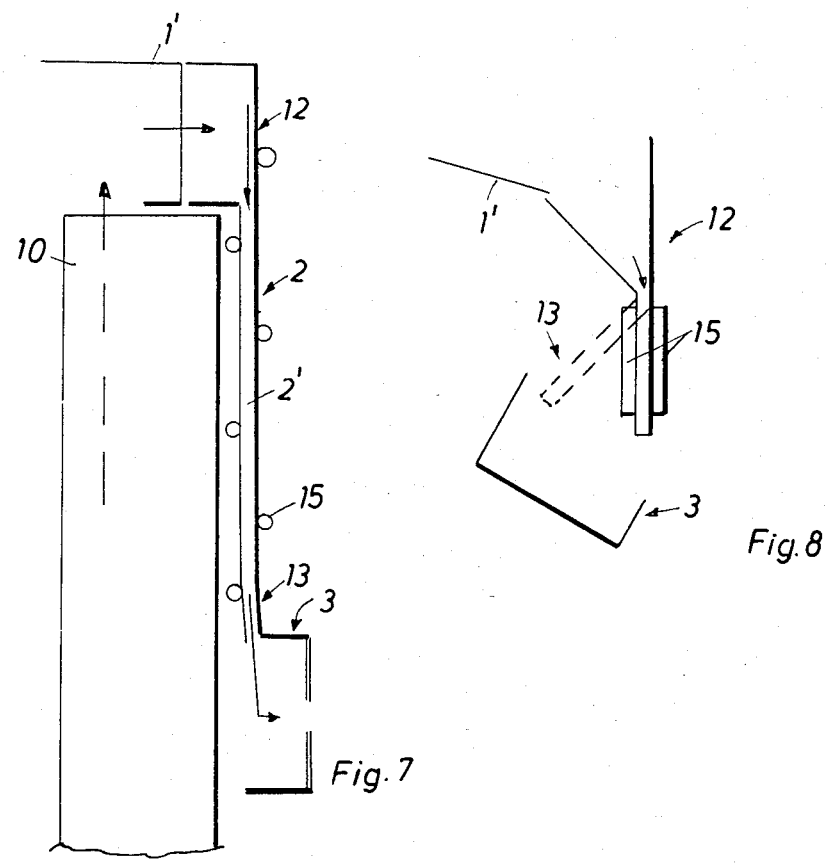
Fig. 7
Fig. 8
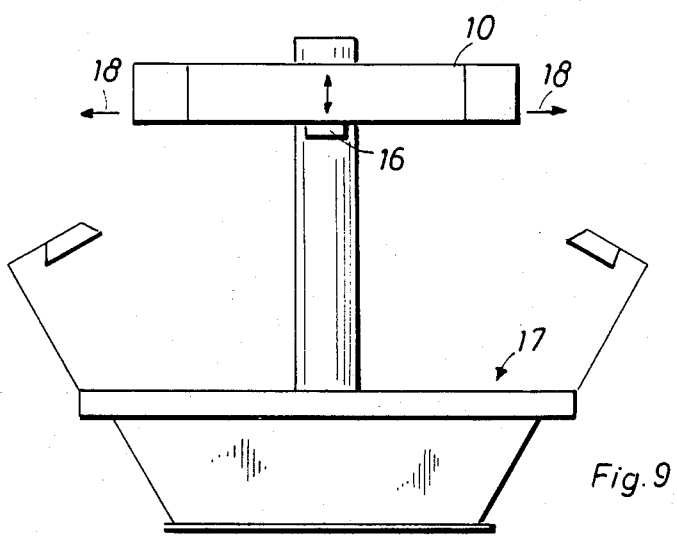
Fig. 9

MICROFILM CAMERA FOR FILMING PUNCH CARDS

BACKGROUND OF THE INVENTION

The invention relates to a microfilm camera for filming punch cards and specifically to a microfilm camera comprised of a camera box containing the exposure and treatment facilities and with punch card conveying elements and with at least one output slot and a punch card collector disposed following said slot, whereby the camera box is vertically adjustable on a column with respect to the artwork table disposed beneath said box.

DESCRIPTION OF THE STATE OF THE ART

Microfilm cameras of the above type are known and in use. Said cameras have camera boxes from which the punch cards exit laterally from slots at one end or both ends of the camera box depending on whether one or two developing facilities are provided within the interior of the box, and are received by the collectors arranged at said ends, with their sides reversed with respect to the originals or artwork. Thus the stacks building up in the collector contain the cards in the correct sequence, however, the reading sides of the cards in the growing stack are up. For the further treatment or filing, the cards of a stack thus have to be reversed by hand, which requires a considerable expenditure in terms of time and work, and even more time and work if the cards are alternately discharged from slots at both sides of a camera box, i.e., in this case, the punch cards from both stacks have to be collated in the correct sequence because the one stack contains only the even-numbered cards and the other stack only the cards with uneven numbers.

SUMMARY OF THE INVENTION

The present invention lies in the arrangement of a reversing facility disposed in the path of conveyance from the output slot of the camera box to the card collector. If the conveyor is a transverse conveyor, said collector is a central collector arranged in the center in front of the camera box.

In the card-collecting operation, said design provides at the same time that the punch cards are stacked with their sides facing the correct direction, i.e., the cards are contained in the stack with their sides facing the correct direction, so that no reversing work is required.

Consequently, when the total stack of cards so collected is removed and turned over, the punch card with the first picture is on top with its reading side up, followed by the second card etc.

In order to assure such a correct sequence of the cards with their reading sides up even when the cards exit alternately from both sides of the camera box, it is advantageous to arrange a transverse conveyor with a central collector. In this case, the two parts of said conveyor convey the cards from the discharge slots at the sides of the camera box from both sides to the central collector by way of the collectors which, in this case, are provided in the form of card chutes. Apart from offering the advantage of central accessibility, said design has the further advantage that the cards coming alternately from each side arrive in the central collector with the correct sequence, namely with their reading sides in the stack facing down.

OBJECTS OF THE INVENTION

One object of the present invention is to provide an improved microfilm camera equipped for such improvement with elements in a way such that the punch cards exiting laterally from the camera box can be collected in the card collector not only in the correct sequence, but also with their inscribed sides facing up.

Another object of the invention is to equip a camera box from which the punch cards are discharged from both sides with elements that permit collecting the punch cards alternately ejected at both sides in a central collector in the correct sequence with the inscribed surface facing down.

Other objects, advantages and novel features of the present invention can be clearly derived from the following detailed description in association with the drawings.

BRIEF DESCRIPTION OF THE DRAWINGS

FIG. 1 shows a special embodiment of the camera box;

FIG. 2 is a top view of the camera box according to FIG. 1;

FIGS. 3-6 are skeleton sketches showing lateral views of the camera box with special designs and arrangements of the reversing facilities;

FIG. 7 is a special embodiment of the reversing element;

FIG. 8 is a skeleton sketch showing a lateral view of the reversing facility according to FIG. 7; and FIG. 9 is a front view of the total microfilm camera.

DESCRIPTION OF THE PREFERRED EMBODIMENT

FIGS. 1 and 2 show that the card-conveying elements 1 or chutes 1' are arranged at the ends of the camera box 10, which are provided with outlet slots 8. Said elements or chutes are directed at a transverse conveyor 2 which, within the center zone, is provided with a central collector 3. The two parts of the transverse conveyor 2 are provided with conveying elements 11, which, in each case, are moving towards the center. Said elements, by way of example, may be endless rubber belts. Said special embodiment of a camera box is only an exemplified embodiment, i.e., the camera box, as far as the card-reversing facility is concerned, could also be a camera box without a transverse conveying facility or one from which the cards are ejected from only one side.

Since the cards exit from the slots 8 of the camera box 10 in an alternating cycle and are delivered to the transverse conveyor 2 with said cycle, the transversely conveyed punch cards are delivered to the center zone with corresponding time intervals, and drop from there, one after the other, into the central collector 3 in the correct sequence.

According to FIG. 3, a run-up strip 5 is advantageously arranged at one side of each discharge end of the camera box 10, on which the punch card exiting from the slot 8 is running up, but from which it must necessarily drop as shown by the dashed lines, so that it is dropping onto the collector 1 with its inscribed surface facing down and, with the special embodiment shown in this figure, subsequently received by the transverse conveyor 2, whereby, however, the collector 1 has to be provided in the form of a card chute 1'. In order to prevent unfavorable air currents from interfering with said card-reversing operation, the entire chute 1' may be fitted with a hood 6 protecting the cards against air currents (said hood is shown by dashed lines also).

According to FIGS. 4 to 6, the reversing action may be achieved also in a different way with more precise guidance. According to FIG. 4, a rapidly swinging reversing plate is arranged following the slot 8 above the chute 1'. As soon as a punch card has been pushed onto said reversing plate 7, said plate is rapidly turned in the direction of the arrow, depositing the punch card on the chute 1' with its sides facing in the correct direction. In order to make the reversing action even safer, a cover plate 7' may be associated with said reversing plate 7 parallel to and with a spacing from the latter as shown in FIG. 5, whereby the one side is closed and the other is open, i.e., said two plates form a pocket that is open on the side from which the cards are received. Said pocket, once it has received a punch card, is turned by more than 180° in the direction of the arrow, permitting the respective punch card to drop from said pocket onto the chute 1' with its sides facing in the correct direction.

It is even more favorable if the reversing facility is arranged as shown in FIG. 6 because said arrangement permits achieving the reversal with practically half the expenditure in terms of design elements required, i.e., if the reversing facility is arranged directly above the central collector 3 of the transverse conveyor 2.

Sufficient time is available even with such a preferred embodiment and arrangement of the reversing facility directly above the central collector 3 because the reversing cycle can be completed rapidly, on the one hand, and the punch cards, because of the required processing time in the camera box (for exposure, development, fixation and drying), arrive within the zone of the central collector 3 alternately coming from both sides at time intervals sufficient for the reversing action.

As mentioned earlier, all said embodiments are feasible if the punch cards are discharged from only one end of the camera box, using, if need be, even a transverse conveyor which, however, would be only half as long, and the collector 3 mounted at the end, said collector being seated in the center of the camera box (FIG. 7) with even better accessibility in any case.

Furthermore, the arrangement of a transverse conveyor 2, regardless whether for a camera box 1 with card discharge at one or both sides, permits a different design of the reversing facility to the extent that the conveying element or the transverse conveyor 2 is provided in the form of a conveying duct 2' according to FIG. 7.

With said design, the receiving end 12 of the transverse conveyor 2 has the shape of a hopper (see FIG. 8), and the cards dropped from the chute 1' in an approximately vertical position are passing through the conveying duct 2' in that position, whereby, however, the discharge end 13 of said duct is twisted as shown in FIG. 8 in a way such that the card discharged is dropped into the central collector 3 or onto the stack building up in said collector with its sides facing in the correct directions, i.e., the discharge end 13 is differently oriented than the receiving end 12 with respect to the vertical line. This merely requires a certain twisting of the walls of the conveying duct within the zone of the discharge end 13.

The punch cards are conveyed with the help of several small rollers 15 arranged on the duct 2', driven by a common drive not shown in the drawing.

According to FIG. 1, the transverse conveyor 2 is secured on the front side on the camera box 10 by means of a suitable holder 14. The optical system 16 of the camera is disposed on said box, directed downwardly against the table 17 for receiving the originals.

The small drives for the conveyor belts 11 of the transverse conveyor 2 and for the reversing facilities according to FIGS. 4 to 6 are not shown in the drawing. Of course, the reversing facilities and the transverse conveyor 2 may be used independently of each other; however, their combination or joint arrangement on the camera box is preferred particularly if the camera box is one from which the punch cards are ejected towards both sides.

FIG. 9 shows the complete microfilm camera with the vertically adjustable camera box 10 and the table for receiving the originals. For the sake of simplicity, this figure does not show the transverse conveyor 2, the collector and the reversing facilities. The punch cards are ejected on both sides in the direction of the arrows 18.

What is claimed is:

1. A microfilm camera for filming punch cards, consisting of a camera box containing the exposing and processing facilities and with punch card-conveying elements and at least one lateral discharge slot and a punch card collector disposed following said slot, whereby a punch card-reversing facility is designed and arranged downstream of the at least one slot and in the feeding direction upstream of the collector in a way such that the punch cards arrive in the collector with their inscribed surface facing down.

2. A camera as defined in claim 1, characterized by the fact that the reversing facility is a rotatable reversing plate.

3. A camera as defined in claim 1, characterized by the fact that the reversing facility disposed above the collector is provided in the form of a unilateral run-up strip.

4. A camera as defined in claim 2, characterized by the fact that the reversing plate is provided with a cover plate arranged parallel to and with a spacing from said reversing plate, and that the two plates have the form of a pocket, said pocket being open at one side in the direction of the feeding and ejection side.

5. A camera as defined in claim 1, characterized by the fact that the discharge slot is associated with a conveying facility leading to a central collector, and that at least one reversing facility is arranged in the path of conveyance from the ejection slot to the collector.

6. A camera as defined in claim 5, characterized by the fact that the reversing facility in the path of the conveying facility is provided and arranged in the form of a conveying duct, the discharge end of said conveying duct being shaped and arranged in a way such that the punch cards arrive in the collector with their inscribed surfaces facing down.

7. A microfilm camera as defined in claim 1, characterized by the fact that if one slot is arranged at each side of the camera box, the collectors are provided in the form of card slides directed at a transverse conveyor provided within the center zone with a central card collector.

8. A camera as defined in claim 7, characterized by the fact that the punch card reversing facilities are arranged in the paths of transportation from the slots to the central collector.

9. A camera as defined in claim 7, characterized by the fact that the punch card reversing facility is formed by a swinging reversing plate.

10. A camera as defined in claim 9, characterized by the fact that the reversing plate is provided with a cover plate disposed parallel to and with a spacing from said reversing plate.

11. A camera as defined in claim 8, characterized by the fact that the punch card reversing facility is arranged above the central collector in the form of a reversing plate.

12. A camera as defined in claim 7, characterized by the fact that the two parts of the transverse conveyor are provided in the form of conveying ducts, whereby the discharge end of each of said ducts is provided with an orientation deviating from the feeding end of the conveying ducts in a way such that the punch cards arrive in the collector reversed in the correct sequence.

* * * * *